(12) United States Patent
Wheeler et al.

(10) Patent No.: US 9,018,146 B2
(45) Date of Patent: Apr. 28, 2015

(54) METHOD OF TREATING A WELL WITH VISCOELASTIC SURFACTANT AND VISCOSIFICATION ACTIVATOR

(75) Inventors: Richard S. Wheeler, Crosby, TX (US); Kay E. Cawiezel, Fulshear, TX (US)

(73) Assignee: Baker Hughes Incorporated, Houston, TX (US)

( * ) Notice: Subject to any disclaimer, the term of this patent is extended or adjusted under 35 U.S.C. 154(b) by 1483 days.

(21) Appl. No.: 11/943,748

(22) Filed: Nov. 21, 2007

(65) Prior Publication Data

US 2008/0176773 A1 Jul. 24, 2008

Related U.S. Application Data

(60) Provisional application No. 60/860,616, filed on Nov. 22, 2006.

(51) Int. Cl.
*C09K 8/68* (2006.01)

(52) U.S. Cl.
CPC ............... *C09K 8/68* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 4,725,372 A | 2/1988 | Teot et al. | |
| 4,790,958 A * | 12/1988 | Teot | 507/237 |
| 4,964,295 A | 10/1990 | Nottingham et al. | |
| 5,258,157 A | 11/1993 | Nozaki et al. | |
| 5,305,832 A | 4/1994 | Gupta et al. | |
| 5,551,516 A | 9/1996 | Norman et al. | |
| 5,697,443 A | 12/1997 | Brezinski et al. | |
| 5,785,747 A | 7/1998 | Vollmer et al. | |
| 5,964,295 A | 10/1999 | Brown et al. | |
| 5,979,557 A | 11/1999 | Card et al. | |
| 6,100,222 A | 8/2000 | Vollmer et al. | |
| 6,140,277 A | 10/2000 | Tibbles et al. | |
| 6,194,356 B1 | 2/2001 | Jones et al. | |
| 6,258,859 B1 * | 7/2001 | Dahayanake et al. | 516/77 |
| 6,350,721 B1 | 2/2002 | Fu et al. | |
| 6,367,548 B1 | 4/2002 | Purvis et al. | |
| 6,399,546 B1 | 6/2002 | Chang et al. | |
| 6,410,489 B1 * | 6/2002 | Zhang et al. | 507/202 |
| 6,432,885 B1 | 8/2002 | Vollmer | |
| 6,435,277 B1 | 8/2002 | Qu et al. | |
| 6,468,945 B1 | 10/2002 | Zhang | |
| 6,482,866 B1 | 11/2002 | Dahayanake et al. | |
| 6,491,099 B1 | 12/2002 | Di Lullo Arias et al. | |
| 6,509,301 B1 | 1/2003 | Vollmer | |
| 6,762,154 B2 | 7/2004 | Lungwitz et al. | |
| 6,767,869 B2 | 7/2004 | DiLullo et al. | |
| 6,828,280 B2 | 12/2004 | England et al. | |
| 6,840,318 B2 | 1/2005 | Lee et al. | |
| 6,844,297 B2 | 1/2005 | Allan et al. | |
| 6,875,728 B2 | 4/2005 | Gupta et al. | |
| 6,881,709 B2 | 4/2005 | Nelson et al. | |
| 6,903,054 B2 | 6/2005 | Fu et al. | |

(Continued)

FOREIGN PATENT DOCUMENTS

| | | |
|---|---|---|
| CA | 2408052 | 11/2001 |
| CA | 2553020 | 8/2005 |

*Primary Examiner* — John J Figueroa
(74) *Attorney, Agent, or Firm* — John Wilson Jones; Jones & Smith, LLP

(57) ABSTRACT

A well treatment fluid contains a viscoelastic surfactant and a viscosification activator. The viscosification activator enhances the viscosity of the well treatment fluid in contrast to a treatment fluid that does not contain a viscosification activator.

25 Claims, 2 Drawing Sheets

(56) References Cited

U.S. PATENT DOCUMENTS

| | | |
|---|---|---|
| 6,904,972 B2 | 6/2005 | Zhang et al. |
| 6,908,888 B2 | 6/2005 | Lee et al. |
| 6,929,070 B2 | 8/2005 | Fu et al. |
| 7,028,775 B2 | 4/2006 | Fu et al. |
| 7,036,585 B2 | 5/2006 | Zhou et al. |
| 7,115,546 B2 | 10/2006 | Qu et al. |
| 7,144,844 B2 | 12/2006 | Qu et al. |
| 7,220,709 B1 | 5/2007 | Qu et al. |
| 7,303,018 B2 | 12/2007 | Cawiezel et al. |
| 7,493,955 B2 | 2/2009 | Gupta et al. |
| 7,572,757 B1 | 8/2009 | Gupta et al. |
| 7,618,926 B1 | 11/2009 | Padulski |
| 7,638,468 B2 | 12/2009 | Gupta et al. |
| 7,699,106 B2 | 4/2010 | Brannon et al. |
| 2003/0139298 A1* | 7/2003 | Fu et al. ................. 507/200 |
| 2004/0209780 A1* | 10/2004 | Harris et al. ............ 507/117 |
| 2004/0214725 A1* | 10/2004 | Moss ....................... 507/129 |
| 2005/0101490 A1 | 5/2005 | Vollmer |
| 2005/0101491 A1 | 5/2005 | Vollmer |
| 2005/0124500 A1* | 6/2005 | Chen et al. .............. 507/200 |
| 2006/0081370 A1 | 4/2006 | Fu et al. |
| 2006/0084579 A1* | 4/2006 | Berger et al. ............ 507/129 |
| 2006/0111248 A1 | 5/2006 | Lee et al. |
| 2006/0131017 A1* | 6/2006 | Garcia-Lopez De Victoria et al. ........................ 166/282 |
| 2007/0042913 A1* | 2/2007 | Hutchins et al. ........ 507/269 |
| 2007/0087941 A1 | 4/2007 | Cawiezel |
| 2008/0217012 A1 | 9/2008 | Delorey |

* cited by examiner

METHOD OF TREATING A WELL WITH VISCOELASTIC SURFACTANT AND VISCOSIFICATION ACTIVATOR

This application claims the benefit of U.S. patent application Ser. No. 60/860,616, filed on Nov. 22, 2006.

FIELD OF THE INVENTION

The invention relates to a well treatment fluid containing a viscoelastic surfactant and a viscosification activator, wherein the viscosification activator is present in an amount effective to initiate or increase the viscosity of the well treatment fluid.

BACKGROUND OF THE INVENTION

Well treatment fluids are often aqueous gellant systems containing a viscoelastic surfactant. When thickened, such fluids may be useful in the control of fluid loss in gas or oil well drilling operations, as proppant carriers and as fluid loss control agents in well completion and workover operations.

Such gellant systems have particular applicability when used in fracturing fluids. Typically, the fracturing fluid is prepared on-the-fly, wherein the base media may be 65° F. or less. Fracturing of the formation is accomplished by pumping the fracturing fluid into the borehole of an oil or gas well under high pressure to create fractures in the rock formation surrounding the wellbore. The fractures radiate outwardly from the wellbore, typically from a few to hundreds of meters, and extend the surface area from which oil or gas drains into the well. Frequently, a proppant, whose function is to prevent the created fractures from closing back down upon itself when the pressure is released, is suspended in the fracturing fluid for transport into the fracture. The proppant filled fractures provide permeable channels allowing petroleum to seep through the fractures into the wellbore where it is pumped to the surface.

The fluid structure of the fracturing fluid should therefore be sufficiently viscous in order to suspend the proppant and to transport the proppant into the formation. In particular, the fracturing fluid should exhibit adequate viscosity prior to reaching the wellbore to ensure proppant placement, though viscosification may not be complete until the fluid reaches the formation.

A problem often encountered with viscoelastic based gellant systems is their inability to develop sufficient viscosity at temperatures lower than about 65° F. Thus, such systems are often ineffective in the transportation of proppants into the formation when the base media temperature is less than 65° F. Further, the temperature gradient is typically insufficient to cause viscosification of the fluid by the time it reaches the perforations. As a result, the efficiency of proppant transport into the formation is severely compromised.

Even in instances where viscosity of the well treatment fluid can be established for proppant transport, the time to effectuate the requisite gellation may be lengthy. In other instances, the cost of the viscoelastic surfactant used in the fracturing fluid may be high.

Alternatives have therefore been sought which will more effectively enhance the viscosity of viscoelastic surfactant containing well treatment fluids, including those fluids which contain a base media having a temperature of less than or equal to 65° F. Alternatives have further been sought which will decrease the time for gellation of viscoelastic surfactant-based well treatment fluids and/or provide a more cost effective alternative to the fluids presently used.

SUMMARY OF THE INVENTION

The well treatment fluid defined herein contains at least one viscoelastic surfactant and at least one viscosification activator. The viscosification activator is present in the well treatment fluid, such as a fracturing fluid, in an amount effective to either initiate viscosification of the well treatment fluid or to increase the viscosity of the fluid. The presence of the viscosification activator, therefore, is instrumental in enhancing the viscosity of a well treatment fluid in contrast to a treatment fluid that does not contain a viscosification activator.

As such, the viscosification activator may be present in a well treatment fluid in an effective amount to provide viscosity to the treatment fluid. The viscosity of the well treatment fluid is thus greater in the presence of the viscosification activator than in the absence of the viscosification activator. At temperatures less than or equal to about 65° F., the presence of the viscosification activator may even provide viscosity to an otherwise non-viscosified fluid.

Generally, the viscoelastic surfactant in the treatment fluid is capable of forming a surfactant assembly. For instance, the viscoelastic surfactant may form either a micellar assembly or vesicular assembly. In its preferred embodiments, the assembly may be worm-like, lamellae or vesicle shaped.

The volumetric ratio of viscoelastic surfactant:viscosification activator in the treatment fluid is between from about 500:1 to about 1,000,000:1, preferably between from about 1,000:5 to about 750,000:1.

Exemplary viscosification activators are alkoxylated alcohols, condensation products of an alkyl phenol and an alkylene oxide, alkylene carbonates and glycol ethers.

Preferred alkoxylated alcohols are those linear and branched chain alkoxylated alcohol of the formula $CH_3(CH_2)_nO(M-O)_m$—H, wherein n is from about 3 to about 22, preferably from about 3 to about 7, m is from about 6 to about 40, preferably from about 2 to about 5, M is $CH_2$—$CH_2$, $CH_2$—$CH_2$—$CH_2$, $CH_2$—$CH$—$CH_3$, $CH_2$—$CH_2$—$CH_2$—$CH_2$, $CH_2$—$CH$—$(CH_3)$—$CH_2$ and mixtures thereof.

Preferred condensation products of an alkyl phenol and an alkylene oxide are those obtained from one mole of alkyl phenol containing from about 6 to 18 carbon atoms in a straight or branched chain configuration, with about 3 to about 100 moles of ethylene oxide.

Preferred glycol ethers are ethylene glycol monobutyl ether, dipropylene glycol methyl ether, dimethyl glycol methyl ether, dipropylene glycol dimethyl ether and diethyleneglycol butyl ether.

Preferred alkylene carbonates are propylene carbonate.

In a preferred embodiment, the viscoelastic surfactant is a mixture of an anionic surfactant, sodium xylene sulfonate, and a cationic surfactant, such as N,N,N,trimethyl-1-octadecamonium chloride. The preferred volumetric ratio of anionic surfactant to cationic surfactant is between from about 1:1 to about 1:1.95.

The treatment fluid may further contain a gaseous foaming agent and/or an inorganic salt.

The well treatment fluid defined herein is preferably prepared and viscosified prior to introduction of the fluid reaching the wellbore.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
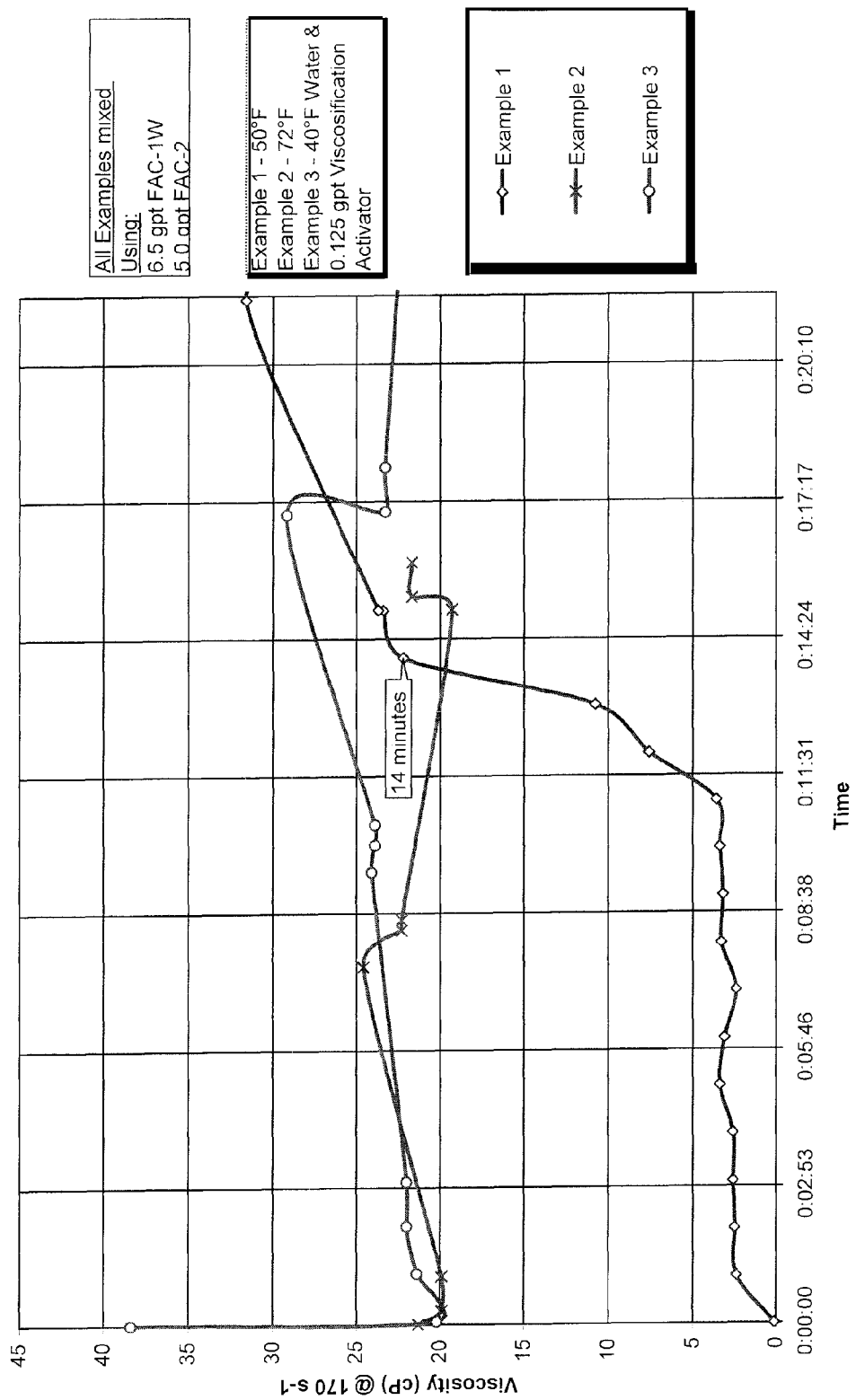
FIG. 1 is a graph, as discussed in the Examples, which depicts the effect on viscosity when using a viscosification activator with a viscoelastic surfactant in accordance with the invention.

The well treatment fluid defined herein contains at least one viscoelastic surfactant and at least one viscosification activator. The viscosification activator is present in the well treatment fluid in an amount effective to either cause the well treatment fluid to viscosify or to provide increased viscosification of the well treatment fluid. The viscosity of a well treatment fluid containing a viscosification activator is thus greater than a corresponding well treatment fluid which does not contain a viscosification activator.

For instance, the viscosification activator may provide viscosity to an otherwise non-viscosified well treatment fluid. For example, a well treatment fluid maintained at a temperature less than or equal to about 65° F., typically exhibits no viscosity. In other instances, such as where the temperature is maintained at temperatures in excess of about 65° F., and especially in excess of 80° F., the viscosification activator augments the viscosity of the treatment fluid.

In essence, the viscosification activator causes solubilization of the viscoelastic surfactant in the base media (water or brine) of the treatment fluid. By solubilizing the viscoelastic surfactant, the viscosification activator provides enhanced viscosity to the treatment fluid. With increased viscosity, the treatment fluid, when used in fracturing, is more efficient in pumping proppant into the wellbore and through the perforations into the fracture.

In its preferred embodiments, the viscoelastic surfactant forms either a micellar or vesicular assembly which, typically, is worm-like, lamellae or vesicle shaped. Alternatively, they may be box-shaped or spherical. Typically, they are spheroidal in cross-sectional area.

The viscoelastic surfactant may be non-ionic, anionic, cationic, zwitterionic or amphoteric or a mixture thereof.

In a preferred embodiment, the viscoelastic surfactant is a mixture of anionic surfactant, such as sodium xylene sulfonate, and cationic surfactant, such as N,N,N,trimethyl-1-octadecamonium chloride. Included within such mixtures are those having a ratio of from about 1:4 to about 4:1 by volume of anionic surfactant to cationic surfactant. The preferred ratio of anionic surfactant to cationic surfactant is between from about 1:1 to about 1:1.95. Representative surfactants include those set forth in U.S. Pat. Nos. 6,410,489 and 6,468,945, herein incorporated by reference.

The volumetric ratio of viscoelastic surfactant:viscosification activator in the treatment fluid is between from about 500:1 to about 1,000,000:1, preferably between from about 1,000:5 to about 750,000:1.

The viscosification activator is typically an alkoxylated alcohol, a condensation product of an alkyl phenol and an alkylene oxide, an alkylene carbonates or a glycol ether or is a mixture thereof.

Preferred alkoxylated alcohols are alkoxylated alkyl alcohols comprising the condensation products of aliphatic alcohols with from 1 to 75 moles of alkylene oxide. The term "alkyl" is meant to represent saturated alkyl hydrocarbons, unsaturated alkyl hydrocarbons or mixtures thereof. Exemplary of such alkoxylated alcohols are those linear and branched chain ethoxylated alcohols having the general structure $CH_3(CH_2)_nO(M-O)_m$—H, wherein n is from about 3 to about 22, preferably from 3 to 7, and m is from about 6 to about 40, preferably from about 2 to about 5, and M is $CH_2$—$CH_2$, $CH_2$—$CH_2$—$CH_2$, $CH_2$—$CH$—$CH_3$, $CH_2$—$CH_2$—$CH_2$—$CH_2$, $CH_2$—$CH$—$(CH_3)$—$CH_2$ or mixtures thereof. In a preferred embodiment, the alkylene oxide is preferably ethylene oxide and/or propylene oxide.

Preferred condensation products of an alkyl phenol and an alkylene oxide are those obtained from one mole of alkyl phenol containing from about 6 to 18 carbon atoms in a straight or branched chain configuration, with about 3 to about 100 moles, typically about 5 to about 50 moles, most typically about 5 to about 20 moles of ethylene oxide. The alkyl group can, for example, be represented by diisobutylene, di-amyl, polymerized propylene, isoctyl, nonyl, and di-nonyl.

Suitable glycol ethers include ethylene glycol monobutyl ether, dipropylene glycol methyl ether, dimethyl glycol methyl ether, dipropylene glycol dimethyl ether, and diethyleneglycol butyl ether. Ethylene glycol monobutyl ether ("EGMBE") is especially preferred.

Preferred alkylene carbonates are propylene carbonate.

The treatment fluid may further contain a gaseous foaming agent.

The treatment fluid may further contain an inorganic salt. The presence of water soluble salts may further enhance formation stability. Typically, water soluble potassium and ammonium salts, such as potassium chloride, tetramethyl ammonium chloride and ammonium chloride, calcium chloride, calcium bromide, magnesium chloride and zinc halide salts, aluminum salts and zirconium salts may be used.

The treatment fluid defined herein is preferably prepared and commences viscosifying prior to the fluid reaching the wellbore. In many instances, the treatment fluid is viscosified prior to the fluid reaching the wellbore.

The well treatment fluid is particularly suitable for use as a fracturing fluid. Suitable proppants for use with such fluids include any conventional proppant known in the art, including sand, bauxite, and relatively lightweight proppants.

While the well treatment fluids described herein have particular applicability in hydraulic fracturing, they may further be used in other well treatment applications, including acid fracturing, etc.

In place of or in addition to the viscoelastic surfactant referenced above, the viscoelastic surfactant may be a $C_{10}$ to $C_{24}$ alkyl trialkyl quaternary ammonium aromatic salt. The alkyl group forming the alkylated moiety can be a $C_{10}$ to $C_{24}$ alkyl group, preferably a $C_{12}$ to a $C_{20}$ alkyl, most preferably $C_{18}$. The aromatic salt is preferably an aromatic salicylate or phthalate. Such surfactants include gelled $C_{18}$ trimethyl quaternary ammonium phthalate or a gelled $C_{18}$ trimethyl quaternary ammonium salicylate including those set forth in U.S. Patent Publication No. 2004/0138071, herein incorporated by reference.

Further, the viscoelastic surfactant may be generated from an amidoamine oxide gelling agent, such as an amidoamine oxide of the structural formula:

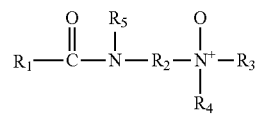

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are independently selected from alkyl or hydroxyalkyl groups of from 1 to about 4 carbon atoms and are preferably hydroxyethyl or methyl. Alternatively, $R_3$ and $R_4$ in the amidoamine oxide of formula I, together with the nitrogen atom to which these groups are bonded, form a heterocyclic ring of up to 6 members. Finally, $R_5$ is hydrogen or a $C_1$-$C_4$ alkyl or hydroxyalkyl group. Such gelling agents are disclosed in U.S. Patent Publication No. US Pat Pub. No. 2005/0067165, herein incorporated by reference.

In another embodiment, the viscoelastic surfactant could be (a) an amine corresponding to the formula $N(R_1R_2R_3)$ wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic; (b) salts of the amine corresponding to the formula $[N(R_1)(R_2)(R_3)(H^+)]X^-$ wherein $R_1$, $R_2$ and $R_3$ are the same as defined hereinbefore and $X^-$ is an inorganic anion; and (c) a quaternary ammonium salt of the amine corresponding to the formula $[N(R_1)(R_2)(R_3)(R_4^+)]X^-$ wherein $R_1$, $R_2$, $R_3$ and $X^-$ are the same as defined hereinbefore and $R_4$ independently constitutes a group which has previously been set forth for $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine.

Preferred viscoelastic surfactants are one or more of erucyl bis(2-hydroxyethyl)methyl ammonium chloride, erucyl trimethyl ammonium chloride; N-methyl-N,N-bis(2-hydroxyethyl) rapeseed ammonium chloride; oleyl methyl bis(hydroxyethyl)ammonium chloride; octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl)ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl)octadecyl amine; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl) ammonium bromide; hexadecyl ethyl bis(hydroxyethyl)ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

Further preferred are the dialkoxylated quaternary ammonium salts of the formula

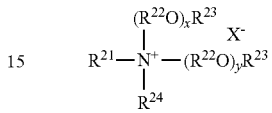

wherein $R^{21}$ is hydrocarbyl or substituted hydrocarbyl having from 1 to about 30 carbon atoms, $R^{22}$ in each of the x ($R^{22}O$) and y ($R^{22}O$) groups is independently $C_2$-$C_4$ alkylene, $R^{23}$ is hydrogen, or a linear or branched alkyl group having from 1 to about 4 carbon atoms, $R^{24}$ is hydrogen or hydrocarbyl or substituted hydrocarbyl having from 1 to about 30 carbon atoms, x and y are independently an average number from 1 to about 40, and $X^-$ is an inorganic anion. In this context, preferred $R^{21}$ and $R^{24}$ hydrocarbyl groups are linear or branched alkyl, linear or branched alkenyl, linear or branched alkynyl, aryl, or aralkyl groups. Preferably, $R^{21}$ and $R^{24}$ are independently a linear or branched alkyl or linear or branched alkenyl group having from 1 to about 25 carbon atoms, $R^{22}$ in each of the x ($R^{22}O$) and y ($R^{22}O$) groups is independently $C_2$-$C_4$ alkylene, $R^{23}$ is hydrogen, methyl or ethyl, and the sum of x and y is an average number from about 2 to about 30. More preferably, $R^{21}$ and $R^{24}$ are independently a linear or branched alkyl group having from 1 to about 22 carbon atoms, $R^{22}$ in each of the x ($R^{22}O$) and y ($R^{22}O$) groups is independently ethylene or propylene, $R^3$ is hydrogen or methyl, and the sum of x any y is an average number from about 2 to about 20. Even more preferably, $R^{21}$ is a linear or branched alkyl group having from about 8 to about 22 carbon atoms and $R^{24}$ is a linear or branched alkyl group having from 1 to about 22 carbon atoms, $R^{22}$ in each of the x ($R^{22}O$) and y ($R^{22}O$) groups is independently ethylene or propylene, $R^{23}$ is hydrogen or methyl, and x is an average number from about 2 to about 20. Most preferably, $R^{21}$ is a linear or branched alkyl group having from about 8 to about 22 carbon atoms and $R^{24}$ is a linear or branched alkyl group having from 1 to about 6 carbon atoms, $R^{22}$ in each of the x ($R^{22}2O$) and y ($R^{22}O$) groups is independently ethylene or propylene, $R^{23}$ is hydrogen or methyl, and x is an average number from about 2 to about 15, or $R^{21}$ and $R^{24}$ are independently a linear or branched alkyl group having from about 8 to about 22 carbon atoms, $R^{22}$ in each of the x ($R^{22}O$) and y ($R^{22}O$) groups is independently ethylene or propylene, $R^{23}$ is hydrogen or methyl, and x is an average number from about 5 to about 15. Preferred dialkoxylated quaternary ammonium surfactants include Ethoquad™ C12 and Ethoquad™ O12 (methyl-bis (2-hydroxyethyl)coco-ammonium chloride and oleyl-ammonium chloride, respectively from Akzo Nobel), Ethoquad™ C15 (a PEG 5 tallow ammonium chloride from Akzo Nobel),) Ethoquad™ T25 (a PEG 15 tallow methyl ammonium chloride from Akzo Nobel), PEG 5 coco methyl ammonium chloride, PEG 5 tallow methyl ammonium chloride, PEG 5 ditallow ammonium bromide, PEG 10 ditallow ammonium bromide, di-dodecyl diEO 10 ammonium bromide, di-coco di EO (15) ammonium chloride, di-dodecyl di EO (15) ammonium chloride, di-dodecyl di EO (10) ammonium bromide, dialkyl (tallow and stearyl) di EO (19.6) ammonium bromide, polypropylene glycol-40 diethyl ammonium chloride (Emcol CC-42 from CK Witco), polypropylene glycol-55 diethyl ammonium chloride (Emcol CC-55 from CK Witco) and tallow methyl EO (8) ammonium chloride.

Further, the viscoelastic surfactant may be a betaine of the formula:

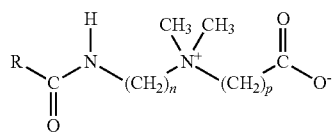

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is the betaine in which R is $C_{17}H_{33}$ or $C_{21}H_{41}$, and n=3 and p=1.

Still further, the viscoelastic surfactant may be a surfactant of the formula $N^+(R_1)(R_2)(R_3)(CH_2COO^-)$ where $R_1$-$R_2$ are each an aliphatic group of $C_1$-$C_4$, branched or straight chained, saturated or unsaturated, $R_3$ is a group of $C_{12}$-$C_{22}$, branched, straight chained or cyclic, saturated or unsaturated.

The viscoelastic surfactant may further be of the formula $N^+(CH_3)_2(R_3)(CH_2COO^-)$ wherein $R_3$ is an alkyl group, alkylene group or acyl group containing between from about 16 to about 24 carbon atoms.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

As used herein:
gpt refers to gallons per thousand;
FAC-1W refers to a $C_{18}$ trimethyl quaternary ammonium chloride, a product of BJ Services Company;
FAC-2 refers to sodium xylene sulfonate.
Viscosification agent, VA, refers to an alkoxylated alcohol of tridecyl alcohol and 6 moles of ethylene oxide.

Examples 1-3

As set forth in Table I, the VA was introduced into the base media (fresh water) and allowed to mix for 30 to 60 seconds. Subsequently, 6.5 gpt of FAC-1W and 5.0 gpt FAC-2 were immediately sequentially added. The resulting fluid was allowed to mix for about 30 seconds.

TABLE I

| Ex. No. | Mixing Temp., ° F. | VA, gpt |
|---|---|---|
| 1 | 50 | — |
| 2 | 72 | — |
| 3 | 40 | 0.125 |

The resulting fluid was then placed in a Fann 35 type rheometer, where viscosity was measured.

Example 1, as illustrated in FIG. 1, demonstrates a time lapse of 12 to 14 minutes for the system to viscosity when the VA is not included in the fluid. Examples 2 and 3 show the effect of room temperature mixing conditions (the treatment fluid not containing VA) versus cold temperature mixing conditions (the treatment fluid containing VA). FIG. 1 shows that gelling occurs immediately when the treatment fluid contains both activator and viscoelastic gellant at a mixing temperature of 40° F. in contrast to the treatment fluid mixed at room temperature. Thus, FIG. 1 demonstrates that use of VA increases the rate of viscosification of the fluid at lower temperature.

Examples 4-6

As set forth in Table II, aqueous surfactant assemblies were prepared at 40° F. by introducing the VA to a base media (fresh water) and then allowing mixing to occur for 30 to 60 seconds. Subsequently, 6.5 gpt of FAC-1W and 5.0 gpt FAC-2 were immediately sequentially added and the resulting fluid was allowed to mix for about 5 minutes.

TABLE II

| Ex. No. | VA, gpt |
|---|---|
| 4 | — |
| 5 | 0.125 |
| 6 | 0.0039 |
| 7 | 0.001 |

Figure 2:
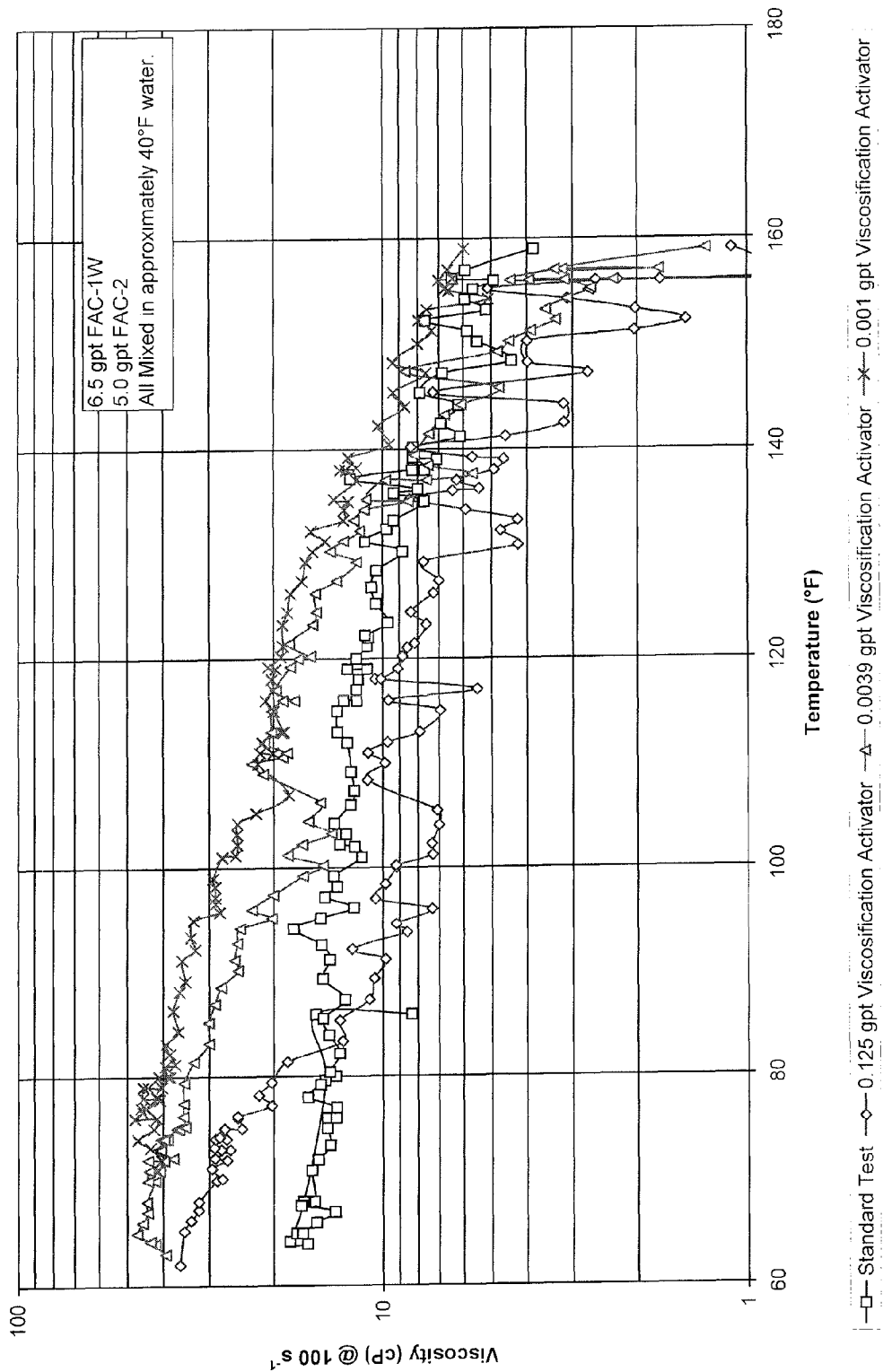
FIG. 2 is a graph, as discussed in the Examples, which illustrates the effect on loading of viscosification activator on the treatment fluids of the invention at increased temperature conditions.

The resulting fluid was then placed in a pressurized Fann 50 type rheometer, where viscosity was measured as the temperature was allowed to increase to about 160° F. Example 4 of FIG. 2 illustrates a baseline at 70° F. Example 5 demonstrates some added viscosity up to about 80° F. Exs. 6 and 7 demonstrate that better results are obtained when the concentration of VA is decreased.

From the foregoing, it will be observed that numerous variations and modifications may be effected without departing from the true spirit and scope of the novel concepts of the invention.

What is claimed is:

1. A method of fracturing a subterranean formation comprising introducing into the subterranean formation a fracturing fluid comprising a proppant suspended in a well treatment fluid, wherein the well treatment fluid comprises water or brine, a viscoelastic surfactant comprising a mixture of an anionic surfactant and a cationic surfactant and a viscosification activator, wherein the volumetric ratio of anionic surfactant to cationic surfactant is from about 1:4 to about 4:1 and further wherein the volumetric ratio of viscoelastic surfactant:viscosification activator is between from about 500:1 to about 1,000,000:1, the viscosity of the well treatment fluid being greater in the presence of the viscosification activator than in the absence of the viscosification activator.

2. The method of claim 1, wherein the fluid contains the viscosification activator in an amount effective to initiate viscosification of the fluid at temperatures less than or equal to about 65° F.

3. The method of claim 1, wherein the viscosification activator is selected from the group consisting of alkoxylated alcohols, condensation products of an alkyl phenol and an alkylene oxide, alkylene carbonates and glycol ethers.

4. The method of claim 3, wherein the viscosification activator is propylene carbonate.

5. The method of claim 3, wherein the viscosification activator is a linear or branched chain alkoxylated alcohol of the formula:

$$CH_3(CH_2)_nO(M\text{-}O)_m\text{—}H$$

wherein n is from about 3 to about 22, m is from about 6 to about 40 and M is $CH_2\text{—}CH_2$, $CH_2\text{—}CH_2\text{—}CH_2$, $CH_2\text{—}CH\text{—}CH_3$, $CH_2\text{—}CH_2\text{—}CH_2\text{—}CH_2$, $CH_2\text{—}CH\text{—}(CH_3)\text{—}CH_2$ or a mixture thereof.

6. The method of claim 5, wherein n is from about 3 to 7 and m is from about 2 to about 5.

7. The method of claim 3, wherein the viscosification activator is a glycol ether selected from the group consisting of ethylene glycol monobutyl ether, dipropylene glycol methyl ether, dimethyl glycol methyl ether, dipropylene glycol dimethyl ether and diethyleneglycol butyl ether.

8. The method of claim 7, wherein the viscosification activator is ethylene glycol monobutyl ether.

9. The method of claim 1, wherein the surfactant is a micellar assembly or vesicular assembly.

10. The method of claim 1, wherein the ratio, by volume, of anionic surfactant to cationic surfactant is between from about 1:1 to about 1:1.95.

11. The method of claim 1, wherein the well treatment fluid further comprises a gaseous foaming agent.

12. The method of claim 1, wherein the anionic surfactant is sodium xylene sulfonate.

13. The method of claim 1, wherein the cationic surfactant is N,N,N,trimethyl-1-octadecamonium chloride.

14. The method of claim 1, further comprising an inorganic salt.

15. The method of claim 1, wherein the volumetric ratio of viscoelastic surfactant:viscosification activator in the fluid is between from about 1,000:5 to about 750,000:1.

16. The method of claim 1, wherein the treatment fluid further comprises a gaseous foaming agent.

17. The method of claim 1, wherein the viscosification activator solubilizes the viscoelastic surfactant in the water or brine of the well treatment fluid.

18. A method of treating a well with a treatment fluid comprising (a) water or brine; (b) a viscoelastic surfactant comprising N,N,N,trimethyl-1-octadecamonium chloride and sodium xylene sulfonate; and (c) a viscosification activator selected from the group consisting of alkoxylated alcohols, condensation products of an alkyl phenol and an alkylene oxide, alkylene carbonates and glycol ethers, the method comprising introducing proppant suspended in the treatment fluid into the well, wherein the treatment fluid has a temperature less than or equal to 65° F. and further wherein the volumetric ratio of viscoelastic surfactant:viscosification activator in the treatment fluid is between from about 500:1 to about 1,000,000:1, the well treatment fluid does not contain a gaseous foaming agent, and the viscosification activator enhances the viscosification of the well treatment fluid transporting the proppant into the formation.

19. The method of claim 18, wherein the viscosification activator is propylene carbonate.

20. The method of claim 18, wherein the viscosification activator is a linear or branched chain alkoxylated alcohol of the formula:

$$CH_3(CH_2)_nO(M\text{-}O)_m\text{—}H$$

wherein n is from about 3 to about 22, m is from about 6 to about 40 and M is $CH_2\text{—}CH_2$, $CH_2\text{—}CH_2\text{—}CH_2$, $CH_2\text{—}CH\text{—}CH_3$, $CH_2\text{—}CH_2\text{—}CH_2\text{—}CH_2$, $CH_2\text{—}CH\text{—}(CH_3)\text{—}CH_2$ or a mixture thereof.

21. The method of claim 18, wherein the viscosification activator is a glycol ether selected from the group consisting of ethylene glycol monobutyl ether, dipropylene glycol methyl ether, dimethyl glycol methyl ether, dipropylene glycol dimethyl ether and diethyleneglycol butyl ether.

22. A method of fracturing a formation comprising introducing into the formation a fracturing fluid comprising a proppant suspended in a well treatment fluid, wherein the well treatment fluid has a temperature less than or equal to 65° F. and wherein the well treatment fluid comprises water or brine; a viscoelastic surfactant comprising N,N,N,trimethyl-1-octadecamonium chloride and sodium xylene sulfonate and a viscosification activator, wherein the viscosification activator is present in the well treatment fluid in an amount effective to increase viscosification of the well treatment fluid and to transport the proppant into the formation, the volumetric ratio of viscoelastic surfactant:viscosification activator in the treatment fluid being between from about 500:1 to about 1,000,000:1 and wherein the viscosity of the well treatment fluid is greater in the presence of the viscosification activator than in the absence of the viscosification activator.

23. The method of claim 22, wherein the well treatment fluid further comprises a gaseous foaming agent.

24. The method of claim 22, wherein the viscosification activator is a linear or branched chain alkoxylated alcohol of the formula:

$$CH_3(CH_2)_nO(M\text{-}O)_m\text{—}H$$

wherein n is from about 3 to about 22, m is from about 6 to about 40 and M is $CH_2\text{—}CH_2$, $CH_2\text{—}CH_2\text{—}CH_2$, $CH_2\text{—}CH\text{—}CH_3$, $CH_2\text{—}CH_2\text{—}CH_2\text{—}CH_2$, $CH_2\text{—}CH\text{—}(CH_3)\text{—}CH_2$ or a mixture thereof.

25. The method of claim 22, wherein the viscoelastic surfactant is a micellar assembly or vesicular assembly.

* * * * *